United States Patent [19]

Zscheile, Jr. et al.

[11] Patent Number: 4,776,012
[45] Date of Patent: Oct. 4, 1988

[54] METHOD OF JUMPING COMPOSITE PN CODES

[75] Inventors: John W. Zscheile, Jr., Farmington; Benjamin V. Cox; Samuel C. Kingston, both of Salt Lake City; Billie M. Spencer, Bountiful, all of Utah

[73] Assignee: Unisys Corporation, Blue Bell, Pa.

[21] Appl. No.: 39,340

[22] Filed: Apr. 17, 1987

[51] Int. Cl.⁴ .............................................. H04L 9/04
[52] U.S. Cl. ........................................ 380/46; 375/1; 364/717; 380/34
[58] Field of Search ................ 375/1; 380/34, 46, 47; 364/717; 331/78

[56] References Cited

U.S. PATENT DOCUMENTS

| | | | |
|---|---|---|---|
| 3,715,508 | 2/1973 | Blasbage | 380/46 |
| 3,728,529 | 4/1973 | Kartchner et al. | 380/46 |
| 4,225,935 | 9/1980 | Zscheile, Jr. et al. | 375/1 |
| 4,379,206 | 4/1983 | Aoki | 380/46 |
| 4,606,039 | 8/1986 | Nicolas et al. | 375/1 |
| 4,606,040 | 8/1986 | David et al. | 375/1 |
| 4,667,301 | 5/1987 | Chiu et al. | 380/46 |
| 4,669,089 | 5/1987 | Gahagan et al. | 380/34 |
| 4,685,132 | 8/1987 | Bishop et al. | 380/46 |
| 4,689,606 | 8/1987 | Sato | 380/46 |

*Primary Examiner*—Salvatore Cangialosi
*Attorney, Agent, or Firm*—John B. Sowell; L. J. Marhoefer; T. J. Scott

[57] ABSTRACT

The present invention is concerned with an apparatus and a method of jumping a composite PN code from a current phase position to a desired predetermined phase position so as to enhance acquisition of a composite PN code. The apparatus includes a plurality of individual PN code generators which are connected to a code combiner to produce a composite PN code. Each of the individual PN code generators is driven by its own timing gate for supplying synchronized clock pulses to its own PN code generator. A master clock is connected to a timing gate before being connected to the individual PN code generators. An inhibit input at each of the individual timing gates is provided so that the individual PN generators may be inhibited a predetermined number of clock pulses which causes the PN code generated to be inhibited and has the effect of jumping the PN code a desired number of phase positions.

9 Claims, 3 Drawing Sheets

METHOD OF JUMPING COMPOSITE PN CODES

BACKGROUND OF THE INVENTION

1. Field of the Invention

This invention relates to pseudonoise (PN) spread spectrum codes. More specifically the present invention relates to a method of jumping a composite PN code so as to enhance reacquistion.

2. Description of the Prior Art

Heretofore when it was necessary to reacquire a PN code it was necessary to search through the code from chip to chip until the code being acquired was in synchronization with the receiving PN generator. It was possible to either speed up the PN generator in the receiver or to slow down the PN generator in the receiver. Long codes can be as long as $10^{10}$ chips long and the repeat time for such long codes can be a matter of days. Thus, if a long code is completely out of sychronization and no history of the last synchronization has been kept it is necessary to search a code that can be so long as to require days for synchronization.

Long codes can be made by combining shorter codes to create composite codes. Composite codes if made by properly combining component codes can not be distinguished from a unique individual long code. The present invention is concerned with a long composite code which was made by properly combining a plurality of composite codes. Heretofore the only way known for searching either individual day long codes or composite long codes was by searching each individual chip as mentioned herein before. It would be extremely desirable to be able to adjust the PN code generator in the receiver so that it would be substantially in sychronization with the PN code being received before a sychronization search is initiated. If such accomplishment could be achieved it would save hours or even days in resychronizating PN code generators during reacquisition.

SUMMARY OF THE INVENTION

It is the principal object of the present invention to provide a method of jumping a PN code generator in a receiver from a current phase position to a desired predetermined phase position which is almost in synchronization with the PN code being received.

It is another primary object of the present invention to provide a method of inhibiting the system clock which drives the component PN code generators of a composite PN code generator so as to advance or retard the composite code any desired number of phase positions.

It is a general object of the present invention to provide a method of modifying existing composite PN code generators so as to provide enhanced reacquition properties.

According to these and other objects of the present invention there is provided in conjunction with a composite code generator apparatus for inhibiting the number of clock system pulses being employed to drive the component code generators by a predetermined number of pulses so as to jump the phase position of the composite code a predetermined number of phase positions.

DESCRIPTION OF THE PREFERRED EMBODIMENT

Figure 1:
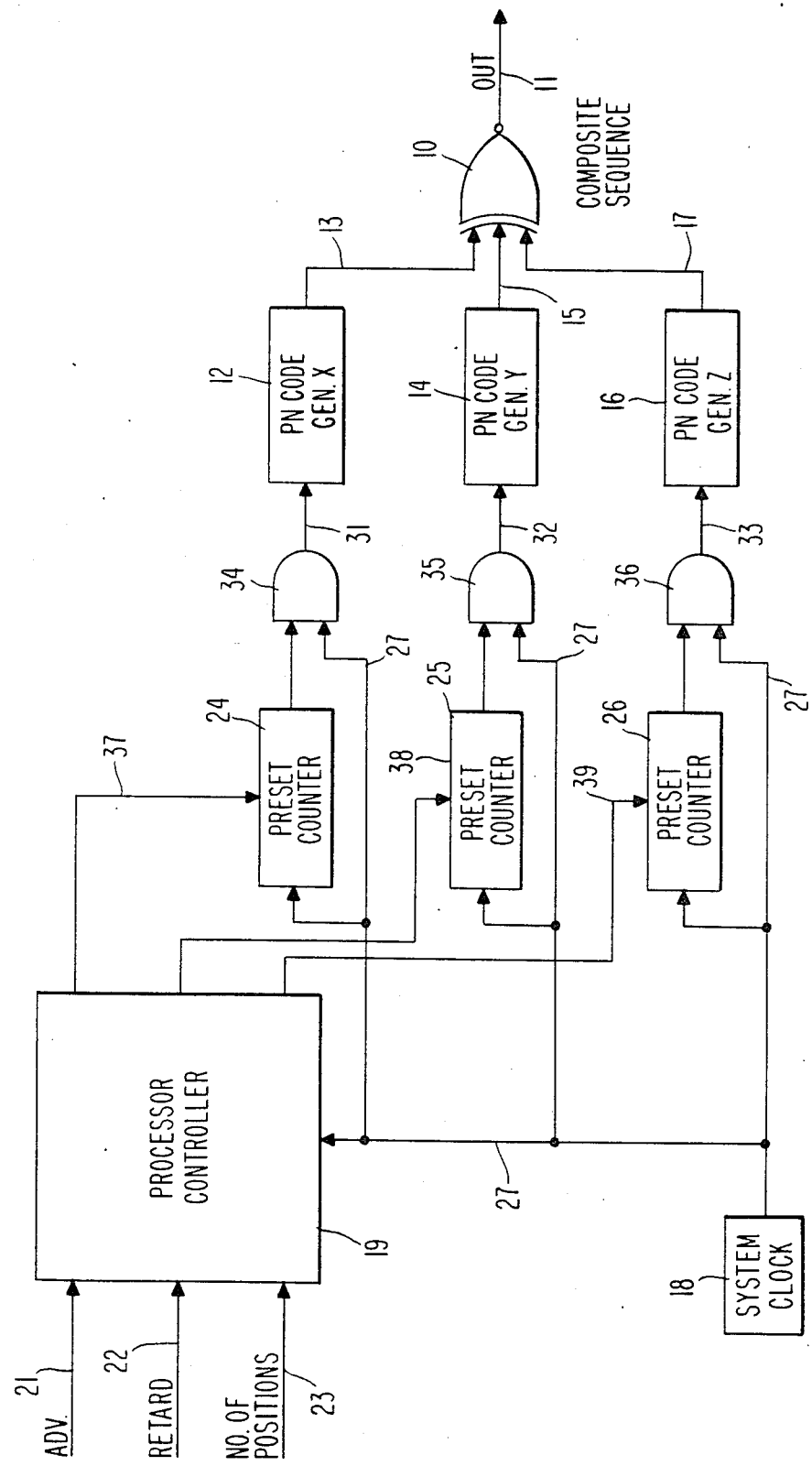
FIG. 1 is a schematic block diagram of a system for generating a composite code from individual component codes which includes a modification for jumping the composite code a predetermined number of phase positions.

Refer now to FIG. 1 showing a schematic block diagram system for generating a composite code and for jumping the composite PN code. It is well know that a modulo two adder 10 such as a exclusive OR gate may be employed to combine component PN codes which are chip synchronized so as to produce a composite PN code on output line 11. PN code generator 12 is shown generating the X component code on output line 13. Similarly PN code generator 14 is shown generating the Y component code on output line 15. In similar manner PN code generator 16 is shown generating the Z component code on output line 17. When the three component PN codes are synchronized as to their chip time the exclusive OR circuit 10 serves as a composite code generator which produces a composite code having a length equal to the length of the X code times the length of the Y code times the length of the Z code. Heretofore it was known practice to employ the same system clock 18 to drive the component code generators 12, 14 and 16. When it was desired to synchronize the composite code on output line 11 with a code being received, the system clock 18 had to be slowed down or sped up so as to slow down or speed up the composite code on output line 11. As explained hereinbefore the repeat or epoch time of long composite codes can require days. When it was desired to advance to another point in the composite code to achieve reacquisition the process of speeding up the system clock could heretofore require days.

In the present invention a processor or controller 19 is provided with at least three inputs, 21, 22 and 23 for indicating to the processor whether to advance or retard and the number of phase positions to be advanced or retarded. Processor 19 makes a calculation which will be explained in detail hereinafter for each of the preset counters X, Y and Z shown as 24, 25 and 26. The numbers set at the preset counter 24, 25 and 26 cause their individual output lines 28, 29 and 30 to stay low for the number of pulses stored in the preset counters 24, 25 and 26. Thus, after inhibited the clock pulses on lines 31, 32 and 33 the inhibit lines 28, 29 and 30 go high permitting the original clock system pulses on line 27 to pass through and gates 34, 35 and 36. The number of inhibited pulses to be applied to lines 37, 38 and 39 will be explained with reference to FIGS. 2 and 3.

Refer now to FIG. 2. FIG. 2A shows the PN timing of bits being generated by generator X on line 13. It will be noted that the epoch length of the code employed for this illustration is two bits long.

Figure 2A:
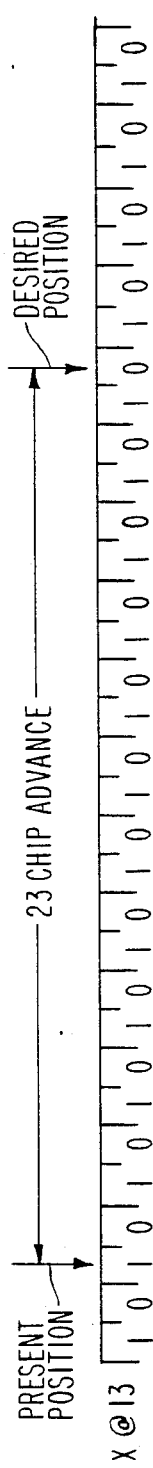
FIGS. 2A to 2C are timing diagrams showing bits generated by the individual component PN generators shown in FIG. 1.
Figure 2B:
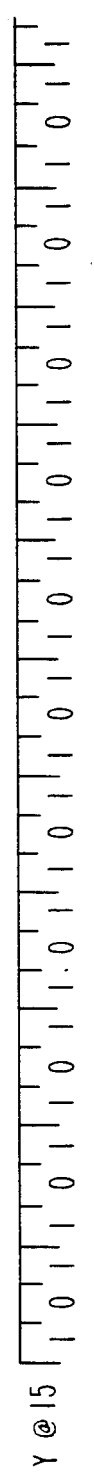
Figure 2C:
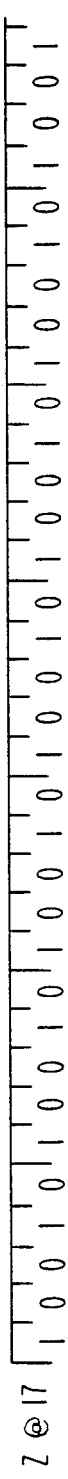
Figure 2D:
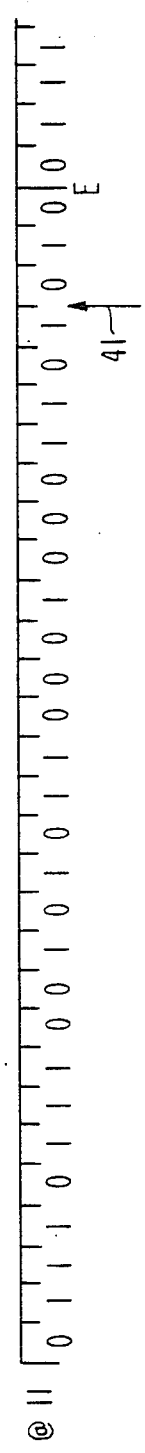
FIG. 2D is a timing diagram showing bits generated by the composite PN code generator of FIG. 1.

FIG. 2B shows the code appearing on output line 15 from code generator Y which is three bits long. FIG. 2C shows the PN code being generated on line 17 from generator Z which is shown to be five bits long. FIG. 2D shows the timing diagram for the PN code which appears on output line 11 from composite code generator 10, shown as an inverting modulo two adder, which repeats its code every 30 bits and has an epoch code length equal to the multiple of the code lengths of the code generators X, Y and Z. The bits of FIGS. 2A to 2D are vertically aligned so that the function of the modulo two adder 10 may be checked. The first output on line 11 is the inverted binary output produced by modulo two addition of three bits in the high state.

In order to best illustrate how the number of clock pulses to be inhibited at each of the individual component PN code generators X, Y and Z is derived the following example will be employed. If we desire to advance the PN code by 23 bits or 23 pulse times the number 23 is placed in the processor 19 and the following calculation takes place. The number of inhibited pulses to be placed in preset counter 24 for inhibiting PN code generated X is equal to Lx minus 23 modulo Lx, where Lx is the length of the component PN code of generator X. In the example explained hereinbefore Lx was two bits long. Lx is divided into 23 to get to get the remainder which is one. Thus, the number of inhibit pulses to be applied to preset counter 24 is 2−1 which equals 1.

Similarly, the number of inhibit pulses to be set into preset counter 25 is equal to Ly minus 23 modulo Ly where Ly is the length of the component PN code of generator Y which is three pulses or three bits long. Thus, 23 divided by three provides a remainder of two and 3−2 is again equal one which is the number of inhibit pulses to be placed in preset counter 25. The number of inhibit pulses to be placed in preset counter 26 is equal to Lz minus 23 modulo Lz where Lz is equal to the length of the component code of generator Z which was illustrated to be five bits of pulses in length. Thus, the number of inhibit pulses to be placed in preset counter 26 is equal to 5 minus 23 divided by five where the remainder is three. Thus, 5−3 is equal to two, the number of pulses to be placed in preset counter 26.

Figure 3A:
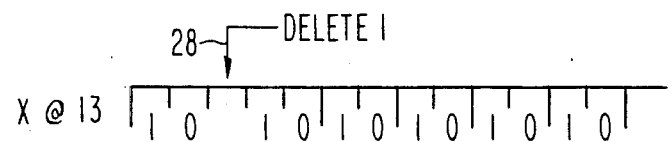
FIGS. 3A to 3C are timing diagram showing bits generated by the individual component PN code generators after inhibiting clock pulses to the PN generators.
Figure 3B:
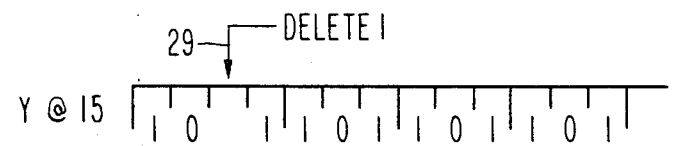
Figure 3C:
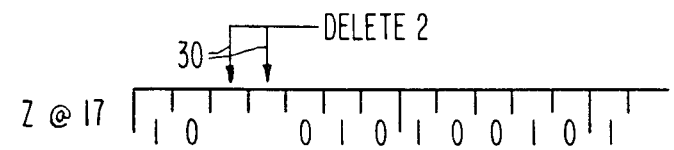
Figure 3D:
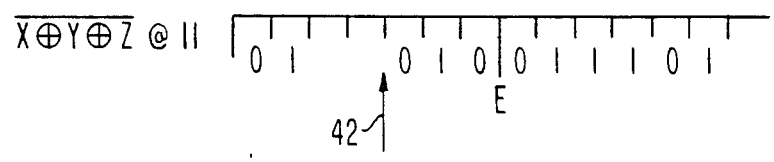
FIG. 3D is a timing diagram showing bits generated by the composite PN code generator after the system clock pulses to the component PN code generators have been inhibited.

Refer now to FIGS. 3A to 3C showing the output of the individual component PN code generators X, Y and Z respectively on lines 13, 15 and 17 respectively. When the delete pulse is applied to line 28 it delays or stops PN generator X for one bit time. As shown in FIG. 3A this causes a right shift effect. The number of inhibit pulses on output line 29 to PN generator Y is shown to be one pulse which delays or stops the PN code generator 14 by one pulse time. This is also shown as having the effect of shifting the timing pulses to the right one bit time. The number of inhibit pulses to be set in preset counter 26 of FIG. 1 was explained hereinbefore to be two inhibit pulse times. The inhibit pulse times on output line 30 is shown delaying or stopping the clock pulses to PN code generator 16 two pulse times which is shown having the effect of shifting the Z code generator output to the right two pulse times.

after the individual component PN code generators have been inhibited, they again stabilize and are driven by the original system clock 18 so as to generate the same composite code on output line 11, however, the code has been advanced by 23 pulse or bit positions. It will now be noted that the output code sequence starting at time 41 on FIG. 2D has been advanced 23 chip times so as to occur at time 42 as shown in FIG. 3D. The complete sequence of bits occuring at time 41 include the epoch which is the start of a complete sequence of PN codes. Similarly, the same epoch is shown in FIGS. 2D and 3D such that the composite code on output line 11 has been jumped or instantaneously moved or advanced in time by 23 pulse times or bits. It will be understood that the illustration described hereinbefore has employed only a maximum of 30 bits in the longest code. Long codes having code lengths of tens of billions of pulse times or bit times employ the identical technique of jumping the PN code. When it is desired to advance the composite PN code by M bits the formula for each of the component PN generators is to inhibit the individual PN code generators by a number Nx equal to Lx-M modulo Lx and when it is desired to retard the composite generator by any predetermined number M bits or pulses it is only necessary to inhibit the individual component code generators by a number of pulses Nx equal to M modulo Lx.

The code should be searched from an advanced position if there is any possibility that reacquisition is to occur in the presence of a repeat jammer or multipath. Repeat jammers employ the technique of receiving the same code which is to be reacquired and, after a slight delay, rebroadcast or retransmit the same received code so as to generate a delayed false PN code which could cause the receiving station to produce a false lock onto the repeated jamming code. By jumping ahead and searching back through the period of uncertainty the received PN code at the receiver will always encounter the true and original PN code before encountering the repeat jammer or multipath thus enhancing the capability of reacquiring the true long PN code.

Having explained a preferred embodiment of the present invention and a modification thereof it will be understood that it is now possible for a receiving and transmitting station to communicate with another receiving and transmitting station using long composite codes and to interrupt the locked-on communications between stations. By maintaining a history of the time of interruption, it can be equated to pulse times or chip times, knowing the clock or chip rate, that must be searched to reacquire the composite code. The PN generator can be jumped ahead of the period of uncertainity and the communications between two stations can be rapidly reacquired after substantially long outages.

What we claim is:

1. Apparatus for jumping the phase of PN composite code of the type comprising a plurality of individual component codes,
   a plurality of individual PN component code generators,
   a code combiner connected to the output of each of said individual PN component code generators for combining said individual component codes to produce a composite code having a code length equal to the length of the individual PN codes multiplied together,
   timing gate means coupled to the input of each said PN component code generator for supplying clock signals to each PN component code generator,
   a master clock connected to one input of each said timing gate means, and
   inhibiting means connected to the input of said timing gate means for inhibiting the output of said individual PN component code generators and for rapidly changing the phase of said composite code a predetermined number of clock or phase positions.

2. Apparatus for jumping the phase of a composite PN code as set forth in claim 1 wherein
said inhibiting means for inhibiting the output of said timing gates means and said PN component code generators further comprises an individual counter connected to the inhibit input of each said timing gate means for inhibiting each said timing gate a predetermined number of clock positions.

3. Apparatus for jumping the phase of a PN composite code as set forth in claim 2 which further includes control means coupled to said individual counters for presetting the predetermined number of clock pulses into said counters to be inhibited.

4. Apparatus for jumping the phase of a PN composite code as set forth in claim 3 wherein said control means includes processor means adapted to calculate the number of clock or phase positions the composite code is to be changed.

5. Apparatus for jumping the phase of a PN composite code as set forth in claim 4 wherein said processor means further includes manual input means for indicating whether the number of phase position to be jumped shall be advanced or retarded.

6. A method of changing the phase of a composite PN code which was derived from a plurality of component PN codes generated by a plurality of PN code generators from a current phase position to a desired predetermined phase position, comprising the steps of;
determining the approximate phase position of the code to be acquired with an allowance for time outage error,
calculating the required phase change of said component PN code generators,
inhibiting the clock pulses to the individual component PN code generators to accomplish the determined phase change, and
combining the inhibited outputs of said component PN generators to provide a rapid phase change without scanning.

7. A method of changing the phase of a composite PN code as set forth in claim 6
wherein the step of calculating the phase change of the component codes comprises inhibiting the number of clock pulses to each individual component PN code generator by an integer number Nx of pulses equal to Lx-M modulo Lx where Nx is the number of pulses to be deleted, Lx is the number of pulses in the component code before it repeats, modulo Lx is the positive remainder when M is divided by Lx and M is the number of pulses desired to be changed in the composite code.

8. A method of changing the phase of a composite PN code as set forth in claim 6 wherein changing the composite code comprises inhibiting the number of clock pulses to each individual component PN generator by an integer number of pulses M equal to M modulo Lx where Lx is the number of pulses in the component code before it repeats itself and M modulo Lx is the positive remainder when M is divided by Lx and M is the number of pulses desired to be changed in the composite code.

9. A method of changing the phase of a composite PN code as set forth in claim 6 which further includes the step of searching backwards through said composite PN code through the area of uncertainty and,
again changing the phase a desired predetermined number of phase positions and repeating the search through the area of uncertainty until the PN code is acquired.

* * * * *